July 6, 1954 C. A. ANDERSON ET AL 2,683,254
VARIABLE TIME DELAY DEVICE
Filed Dec. 20, 1951

Inventors
C. A. Anderson
W. H. Barrie
By Robert B. Harmon
Attorney

Patented July 6, 1954

2,683,254

UNITED STATES PATENT OFFICE 2,683,254

VARIABLE TIME DELAY DEVICE

Clarence A. Anderson, Belleville, Ontario, and William H. Barrie, Foxboro, Ontario, Canada, assignors to Northern Electric Company, Limited, Montreal, Quebec, Canada, a corporation of Canada Application December 20, 1951, Serial No. 262,635

3 Claims. (Cl. 333—30)

This invention relates to a variable time delay device, and more particularly to a delay device which can be employed at frequencies below 300 kilocycles per second to obtain a delay equivalent to several signal periods.

Many methods of obtaining delay have been proposed in the past. At higher frequencies, for example, above 10 megacycles, it is practical to construct a delay device consisting of an artificial line which can be varied in effective length. Such means becomes impractical at lower frequencies due to the bulk and cost of the equipment. Proposals for mechanical and acoustic delay lines for use at lower frequencies have been offered, but such devices have had serious draw backs, such as poor accuracy, poor temperature coefficient, large size and weight, etc.

In the invention disclosed herein, the time delay is obtained by means of a magnetic recording and reproducing system which overcomes the objections which have been experienced in the past.

It is an object of this invention to provide a variable delay device which is small in size and weight.

It is a further object of this invention to provide a variable delay device which may be used below 300 kilocycles per second.

It is a further object of this invention to provide a variable delay device which has sufficient accuracy for use in computing systems.

There are many difficulties inherent in a delay system which employs the magnetic recording technique, as for example, the low efficiency due to out-of-contact recording, and the tendency for stray fields from the recording head to mask the signal obtained at the reproducing head. It will be seen that the invention disclosed herein overcomes these difficulties in a practical fashion.

An understanding of the invention may be had by reference to the drawings, in which.

Figure 1:
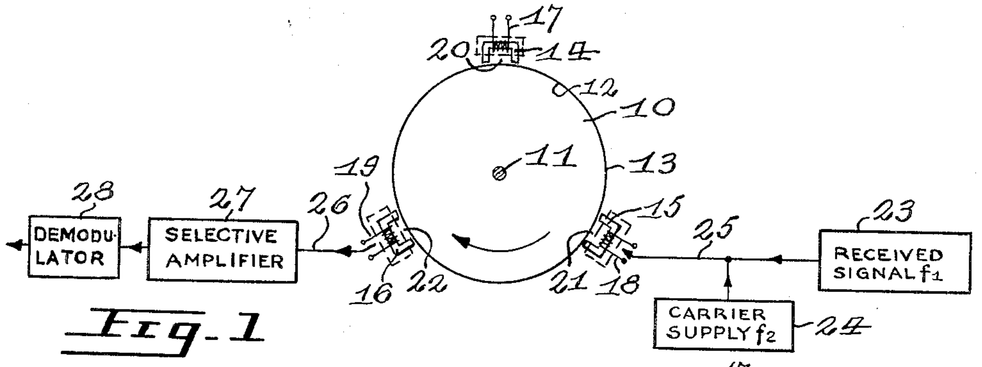
Fig. 1 is a schematic of the disclosed invention.

Referring to Fig. 1, disc 10 revolves at constant speed in a clockwise direction about its axis 11. The periphery 12 of disc 10 has a magnetic coating 13 of magnetic material. Spaced along the periphery of the disc 10 are magnetic heads 14, 15 and 16 having windings 17, 18 and 19, respectively, and air gaps 20, 21 and 22, respectively. The magnetic circuit through magnetic heads 14, 15 and 16, is partially closed by magnetic coating 13. Winding 17 is energized with a direct current which causes a saturating flux through magnetic coating 13. The function of magnetic head 14 is to erase the effect of previous signals on magnetic coating 13 and condition it to a non-linear portion of its hysteresis curve. It is hereinafter referred to as the conditioning head. Winding 18 is energized with the received signal $f_1$ from receiver 23 and a carrier of frequency $f_2$ from carrier supply 24 through input 25. The function of magnetic head 15 is to record the input signals on magnetic coating 13, and is hereinafter referred to as the recording head.

Because the condition of magnetic coating 13 affects the magnetic properties of recording head 15 so little, winding 18 may be made to present a linear impedance to input 25, and therefore only frequencies $f_1$ and $f_2$ flow in winding 18. However, due to the non-linear characteristic of the magnetic coating 13, frequencies $f_1$ and $f_2$, plus their modulation products, including $f_1 \pm f_2$ are recorded on the magnetic coating 13. As will be shown later, the presence of the modulation product frequencies in the magnetic coating 13 and their absence from recording head 18 is a desirable and essential feature of this invention.

As the magnetic coating passes magnetic head 16, the recorded frequencies are induced in winding 19. Magnetic head 16 is hereinafter referred to as the play-back head. The output signal at 26 from play-back head 16 contains frequencies $f_1$ and $f_2$ and their modulation products including $f_1 \pm f_2$. By passing the output signal at 26 through a selective amplifier 27, the desired output signal may be selected.

It will be seen that the signal delay D from input 25 to output 26 is a function of the angular velocity $\omega$ of disc 10, and the angular separation $\phi$ of recording head 18 and play-back head 16 and is, in fact, given by the expression $$D = \frac{\phi}{2\pi\omega}$$

By making play-back head 16 movable along the periphery of disc 10, the angular separation $\phi$ may be varied and hence the delay D varied. Alternately the angular velocity $\omega$ may be varied within limits to achieve the same results.

If we assume that $\phi = 90°$ and $\omega = 4800$ R. P. M., then $D = 3.125$ microseconds.

In a preferred embodiment of the invention magnetic heads 14, 15 and 16 are spaced 3 or 4 thousandths of an inch from magnetic coating 13. This clearance is a compromise between the loss introduced by out of contact recording and reproducing, and the practical tolerances for mechanical performance.

At frequencies of 200,000 cycles per second, the loss introduced by spacing recording head 15 and reproduce head 16 may be 5 db at each head per mil separation. Thus if each of heads 15 and 16 be separated 4 mils, a system loss of 40 db compared to in contact recording and reproducing is introduced. As a result, the delayed signals and frequency $f_1$ induced in winding 19 by the motion of magnetic coating 13 past gap 22 may be of the same order of magnitude as undelayed signals of frequency $f_1$ induced in winding 19 by the stray flux from recording head 18. It was found to be impractical to eliminate stray fields by means of shielding. However, as mentioned earlier, the introduction of frequency $f_2$ at input 25, results in recording sum and difference frequencies $f_1 \pm f_2$ on magnetic medium 13. As frequencies $f_1 \pm f_2$ do not flow in winding 18, they are not present in the stray flux from recording head 15. Hence delayed signals from output 26 of frequency $f_1 \pm f_2$ may be separated and amplified by selective amplifier 27 without interference from undelayed signals due to stray magnetic fields. A delayed signal $f_1$ containing the intelligence present in the receive signal $f_1$ may, in turn, be obtained from $f_1 \pm f_2$ by demodulator 28, in a fashion well known to the art.

It is essential that disc 10 be rotated at a constant angular velocity. This may be accomplished by the use of a synchronous hysteresis motor driven from a supply of constant frequency, and good wave form.

Figures 2, 3:
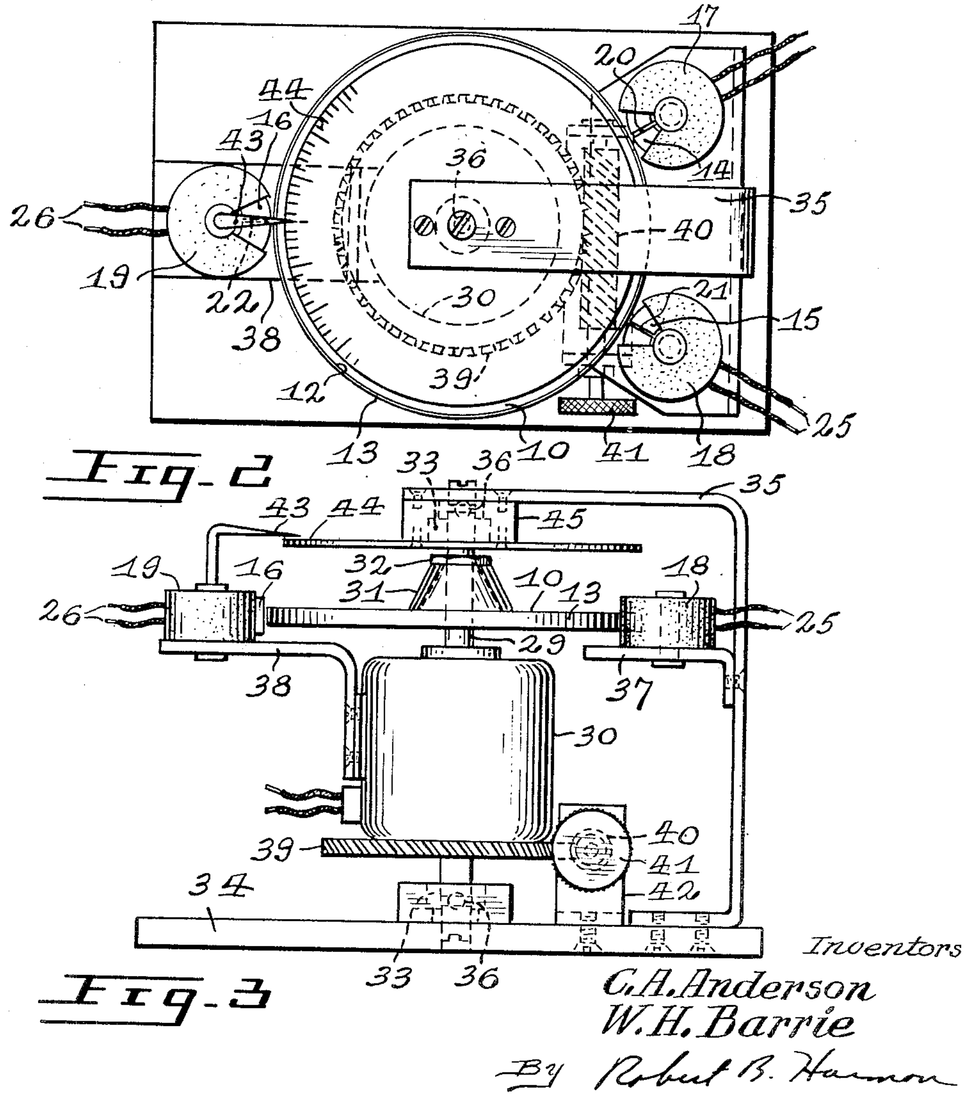
Fig. 2 is a plan view of a preferred embodiment of the invention.
Fig. 3 is an elevation view of a preferred embodiment of the invention.

Referring now to Figs. 2 and 3, disc 10 is a brass disc which may be five inches in diameter and one quarter inch in thickness. Deposited by electrodeposition on the periphery of disc 10 is a magnetic coating 13 consisting of a nickel-cobalt alloy, such as has been used in the industry for deposition on wire for wire recorders, and is well known to the art. Other deposits known to the art, may be used, as, for example, dispersions of iron oxide in a suitable vehicle, but are more difficult to control with respect to the thickness of deposit. Since variations in the thickness of deposit may introduce undesirable amplitude modulation, this variation must be kept to a minimum.

Disc 10 is mounted on the shaft 29 of a synchronous motor 30 by means of tapered bushing 31 and locknut 32. The motor shaft 29 may rotate freely in bearings 33, 33, which are rigidly mounted to base 34 and bracket 35. Simple ball thrusts 36, 36 support the weight of motor 30.

Conditioning heads 14, and play-back head 15 are mounted on support 37. Play-back head 16 is fixed to the housing of motor 30 by means of mounting 38. Also fixed to the motor housing 30 is a gear 39 meshed with a worm 40. Worm 40 is rotatably mounted in bracket 42, which latter is fixed to base 34. By rotating knurled wheel 41, the angular separation of and hence the delay between recording head 15 and play-back head 16 may be varied. A pointer 43 fixed to play-back head 16 may be used to indicate the delay directly on scale 44 fixed to bearing mount 45.

What is claimed is:

1. A variable delay device employing a magnetic recording medium conditioned to a non-linear characteristic and driven at constant velocity past a recording head and a reproducing head sequentially, means for energizing said recording head with a received signal and a local frequency simultaneously, and means for selectively reproducing modulation product frequencies of said received signal and said local frequency, said reproducing head being positionable along the path of travel of said recording medium at variable distances from said recording head.

2. A variable time delay device employing a disc of non-magnetic material, a uniform deposit of magnetizable material deposited on the periphery of said disc, means for rotating said disc at constant angular velocity, a first, second and third magnetic head disposed along the periphery of said disc, said first and second magnetic heads being fixed in position and said third magnetic head being positionable along the periphery of said disc, a source of direct current connected to said first magnetic head, a first source of signal frequency $f_1$ and a second source of signal frequency $f_2$ connected to said second magnetic head, said third magnetic head providing means to reproduce signals of frequency $f_1 \pm f_2$, an amplifier selective to frequencies $f_1 \pm f_2$ connected to said third magnetic head, and a demodulator connected to said selective amplifier.

3. A variable time delay device employing a rotatable disc, means for rotating said disc at constant angular velocity, a uniform deposit of magnetic recording material on the periphery of said disc, means for conditioning said recording material to have a non-linear recording characteristic, means to expose said recording material when so conditioned to a magnetic flux of frequency $f_1$ and $f_2$ in such a fashion that frequencies $f_1$, $f_2$ and their modulation products including $f_1 \pm f_2$ are recorded in said recording medium, means for reproducing selectively said frequency $f_1 \pm f_2$, and means for demodulating the selectively reproduced signal of frequency $f_1 \pm f_2$, said reproducing means being positionable along the periphery of said disc at variable distances from said exposing means.

References Cited in the file of this patent

UNITED STATES PATENTS

| Number | Name | Date |
|---|---|---|
| 2,470,839 | Zuschlag | May 24, 1949 |

OTHER REFERENCES

Article, "Supersonic Bias for Magnetic Recording" by Holmes & Clark, published in "Electronics," (McGraw Hill), July 1945, pages 126–136. (Copy in 179–100.2.)